United States Patent
Braun et al.

(10) Patent No.: US 8,277,329 B2
(45) Date of Patent: Oct. 2, 2012

(54) HOMOKINETIC PLUNGING BALL JOINT WITH LOW PLUNGING FORCES

(75) Inventors: Frank Braun, Neuwied (DE); Joachim Prölss, Ober-Ramstadt (DE); Volker Bergmann, Stockstadt (DE); Hans Wormsbaecher, Lake Orion, MI (US)

(73) Assignee: GKN Driveline Deutschland GmbH, Offenbach (DE)

( * ) Notice: Subject to any disclaimer, the term of this patent is extended or adjusted under 35 U.S.C. 154(b) by 169 days.

(21) Appl. No.: 12/600,796

(22) PCT Filed: May 2, 2008

(86) PCT No.: PCT/EP2008/055423
§ 371 (c)(1),
(2), (4) Date: May 3, 2010

(87) PCT Pub. No.: WO2008/141907
PCT Pub. Date: Nov. 27, 2008

(65) Prior Publication Data
US 2010/0216559 A1    Aug. 26, 2010

(30) Foreign Application Priority Data

May 18, 2007 (DE) .......................... 10 2007 023 354

(51) Int. Cl.
*F16D 3/223* (2011.01)
(52) U.S. Cl. ....................................... 464/144; 464/906
(58) Field of Classification Search .................. 464/140, 464/144–146, 906
See application file for complete search history.

(56) References Cited

U.S. PATENT DOCUMENTS

| 5,026,325 A | 6/1991 | Welschof |
| 7,621,816 B2 * | 11/2009 | Weckerling et al. .......... 464/145 |

FOREIGN PATENT DOCUMENTS

DE    38 18 730 C1    7/1989
(Continued)

OTHER PUBLICATIONS

PCT International Search Report for PCT/EP2008/055423 dated Aug. 27, 2008.

*Primary Examiner* — Gregory Binda
*Assistant Examiner* — Josh Skroupa
(74) *Attorney, Agent, or Firm* — Rader, Fishman & Grauer, PLLC

(57) ABSTRACT

A homokinetic rotary ball joint in the form of a plunging joint is described. The joint comprises a joint outer part 3 with outer first ball tracks 4 and with outer second ball tracks 5, the outer second ball tracks 5 intersecting a joint mid-axis A when the joint is aligned; a joint inner part 6 with inner first ball tracks 7 and with inner second ball tracks 8, the inner second ball tracks 8 intersecting the joint mid-axis A when the joint is aligned; first balls 9 which are held in first pairs of tracks including, in each case, an outer first ball track 4 and of an inner first ball track 7; second balls 10 which are held in second pairs of tracks including, in each case, an outer second ball track 5 and of an inner second ball track 8, in each case the outer and the inner ball track 5, 8 of the second pairs of tracks intersecting one another; a ball cage 12 which has, distributed circumferentially, cage windows 13, 14 in which the first and the second balls 9, 10 are held in a common plane; a second radial play formed between the second balls 10 and the second ball tracks 5, 8 is greater than a first radial play formed between the first balls 9 and the first ball tracks 4, 7.

19 Claims, 8 Drawing Sheets

FOREIGN PATENT DOCUMENTS

| | | |
|---|---|---|
| EP | 1 762 736 A1 | 3/2007 |
| JP | 39-13402 B | 7/1939 |
| JP | 50014957 A | 2/1975 |
| JP | 2256923 A | 10/1990 |
| JP | 03 172621 A | 7/1991 |
| WO | WO-2007028436 A1 | 3/2007 |

* cited by examiner

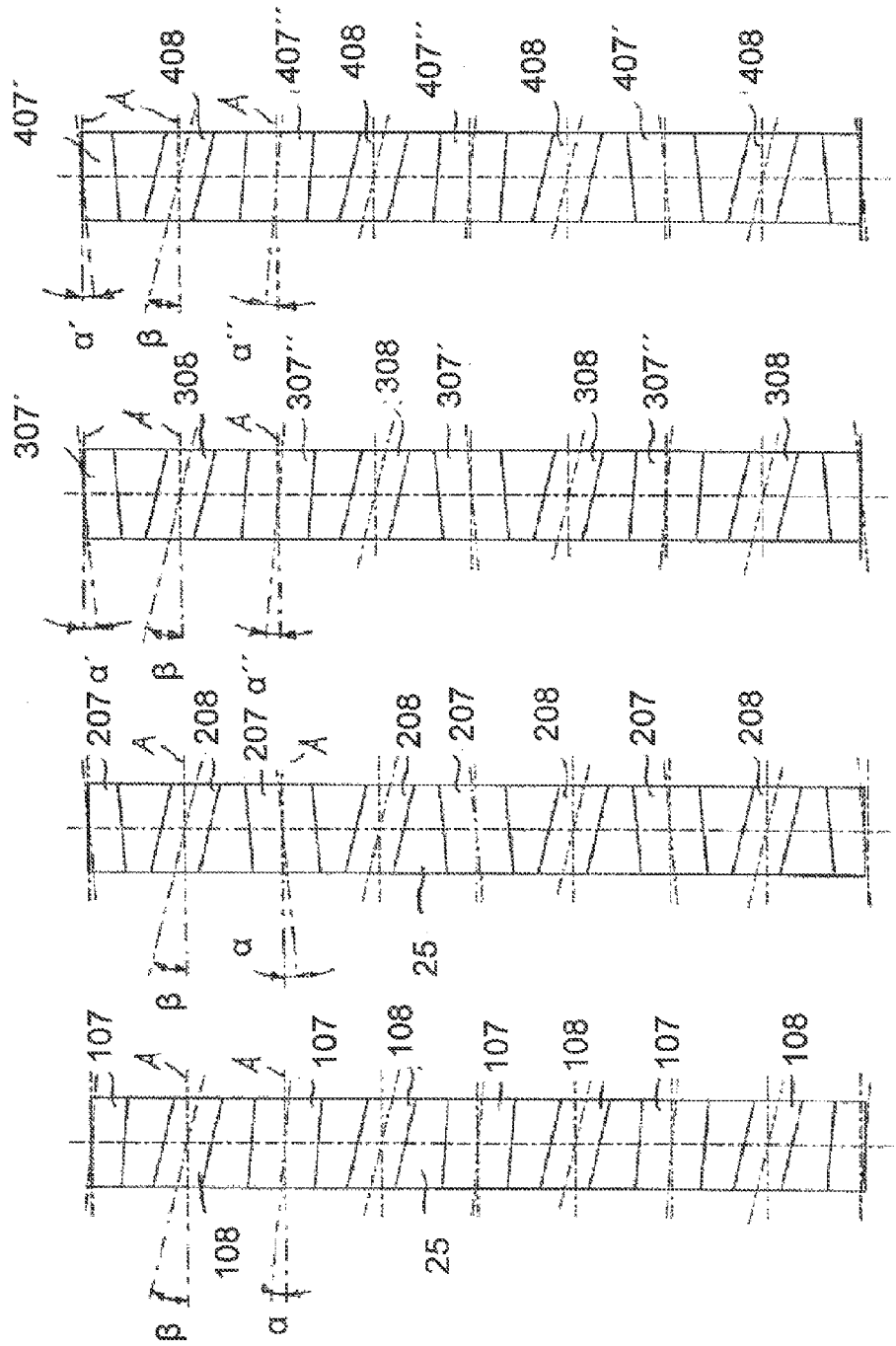

HOMOKINETIC PLUNGING BALL JOINT WITH LOW PLUNGING FORCES

CROSS REFERENCE TO RELATED APPLICATIONS

This application is a National Phase of International Application No. PCT/EP2008/055423, filed on May 2, 2008, which claims priority to German Patent Application No. 10 2007 023 354.1 filed on May 18, 2007, which applications are hereby incorporated by reference in their entirety.

TECHNICAL FIELD

The invention relates to a homokinetic rotary ball joint in the form of a plunging joint, which may be, in particular, for use in the driveline of a motor vehicle.

BACKGROUND

A joint of the type mentioned is known from DE 38 18 730 C1. In the inner and the outer joint part, tracks, in each case with axially parallel center lines, are formed, in which balls for torque transfer are guided, and also tracks with intersecting center lines are formed, in which balls for controlling the ball cage are guided onto the bisecting plane. Homokinetic plunging joints of this type are designated by the applicant with the designation SC joints or PC joints (previously XL joints) which are distinguished by good axial displaceability, along with low effort.

The applicant's DE 10 2006 020 711.4 discloses a further homokinetic plunging joint with intersecting ball tracks, having a ball cage produced from a hollow profile.

With the joint aligned, only the balls guided in the tracks having axially parallel center lines transfer a torque, whereas the balls guided in the tracks having intersecting center lines serve merely for controlling the joint. By contrast, when the joint articulates, the balls guided in the tracks having intersecting center lines also participate in torque transfer as a function of the articulation angle of the joint. On account of the friction of these balls, this leads, with increasing articulation of the joint, to high axial plunging forces.

SUMMARY

The plunging joint described in the present disclosure comprises a joint outer part with outer first ball tracks and with outer second ball tracks, the outer second ball tracks intersecting a joint mid-axis when the joint is aligned; a joint inner part with inner first ball tracks and with inner second ball tracks, the inner second ball tracks intersecting the joint mid-axis when the joint is aligned; first balls which are held in first pairs of tracks including, in each case, an outer first ball track and of an inner first ball track; second balls which are held in second pairs of tracks including, in each case, an outer second ball track and of an inner second ball track, in each case the outer and the inner ball track of the second pairs of tracks intersecting one another; and a ball cage which has, distributed circumferentially, cage windows in which the first and the second balls are held in a common plane.

Homokinetic plunging joints of this type are used, for example, as transmission-side joints in sideshafts which connect a differential for torque transfer to a wheel of the motor vehicle. They are also used, however, in longitudinal driveshafts (propshafts) for torque transfer between a gear-shift transmission and a differential.

The homokinetic rotary ball joint of the type described herein, has lower axial plunging forces and therefore good vibration decoupling, particularly even with the joint articulated. The structure of a homokinetic rotary ball joint according to the features of the independent claims is describe herein. Preferred embodiments of the invention are mentioned in the dependent claims, wherein the features of the claims can be combined in any reasonable manner. Additional embodiments are mentioned in the following description, in particular with reference to the figures.

A homokinetic rotary ball joint in the form of a plunging joint of the type mentioned above, in which a second radial play formed between the second balls and the second ball tracks is greater than a first radial play formed between the first balls and the first ball tracks. With regard to this configuration, in one exemplary embodiment, a greater axial play is formed in each case between the second balls and the associated second cage windows than between the first balls and the associated first cage windows.

Another exemplary embodiment is disclosed that comprises a homokinetic rotary ball joint in the form of a plunging joint of the type mentioned above, in which a second axial play formed between the second balls and the second cage windows is greater than a first axial play formed between the first balls and the first cage windows.

A further exemplary embodiment is a combination of the embodiments mentioned above, that is to say in a plunging joint of the type mentioned above, in which both in each case a second radial play formed between the second balls and the second ball tracks is greater than a first radial play formed between the first balls and the first ball tracks and in each case a second axial play formed between the second balls and the associated second cage windows is greater than a first axial play formed between the first balls and the associated first cage windows.

The exemplary embodiments have the advantage that frictional forces between the controlling second balls and the second ball tracks, particularly when the joint is articulated, are reduced. Thus, during torque transfer under articulation, the second balls are relieved, so that vibrations between the joint inner part and the joint outer part are decoupled. This leads, overall, to an improved NVH behavior (noise, vibration, harshness) in the drive train.

According to another exemplary embodiment which relates to all three previously described embodiments, as seen in the cross section through the aligned joint, the radial spacing of the track center lines $PCR_a$ of the outer second ball tracks with respect to the joint mid-axis is greater than the radial spacing $PCR_i$ of the track center lines of the inner second ball tracks with respect to the joint mid-axis A, which here corresponds to the nominal radial spacing $PCR_{nom}$. By virtue of this measure, the second balls, which serve for control in the aligned state of the joint, are freed, this having a positive effect on the frictional forces. According to an alternative or additional embodiment, the radial spacing of the track center lines $PCR_i$ of the inner second ball tracks with respect to the joint mid-axis is, as seen in the cross section through the aligned joint, smaller than a nominal radial spacing $PCR_a$ between the track center lines of the outer second ball tracks and the joint mid-axis, which here corresponds to the nominal radial spacing $PCR_{nom}$. Embodiments of such joints are in detail explained in connection with FIGS. 1a, 2, 3.

Further, there may alternatively or additionally be provision for the nominal radius of the inner and/or outer second ball tracks to be greater than the radius of the center balls in the cross section through the joint. An embodiment of this joint is, in detail, explained in connection with FIG. 4. By virtue of this configuration, the second balls are likewise relieved when the joint articulates, thus leading to reduced axial forces and consequently an improved NVH behavior. According to one exemplary refinement, the cross section of the first ball tracks is configured in such a way that in each case two-point contact with the associated torque-transferring first ball is provided. The same applies to the second ball tracks, the cross-sectional shape of which is configured such that the second balls can theoretically come to bear at two points. For example, the ball tracks may have an elliptical or ogival cross section. Other cross-sectional shapes may, of course, also be envisaged.

According to another refinement, the second balls, which serve for cage control, have a smaller diameter than the first balls which serve for torque transfer. The advantage of this arrangement is that the torque-transferring first balls can, overall, have a larger configuration, with the result that a high torque transfer capacity of the joint can be achieved.

According to another embodiment of the joint, the outer and the inner first ball tracks run parallel to the joint mid-axis when the joint is aligned. An exemplary arrangement of an embodiment of this joint is, in detail, explained in connection with FIG. 1c.

According to a further alternative embodiment, the outer and inner first ball tracks intersect the joint mid-axis when the joint is aligned, the first angles which the first ball tracks form with the joint mid-axis being smaller than the second angles which the second ball tracks form with the joint mid-axis. In this case, the first angles which the first ball tracks of the respective joint part form with the joint mid-axis and the second angles which the second ball tracks of the same joint part form with the joint mid-axis are codirectional (meaning e.g. unidirectional, oriented in the same direction). What is achieved by the staggered first ball tracks is that the webs formed in the circumferential direction between the first and the second ball tracks are widened, this having a beneficial effect on the strength of the joint. Additional information is given in connection with the explanation of joints depictured in FIGS. 7, 8, 9, 10.

The second angles which the second ball tracks of the joint outer part form with the joint mid-axis are equal and opposite to the second angles which the second ball tracks of the joint inner part form with the joint mid-axis. The second ball tracks of the joint outer part and of the joint inner part are preferably in each case codirectional with one another, that is to say they run parallel to one another, as seen in a developed view. The first ball tracks of the joint outer part and of the joint inner part may be codirectional with one another, or they may in each case be subdivided into two groups, of which the first ball tracks of the first group are in each case directed opposite to the first ball tracks of the second group with respect to the joint mid-axis.

Accordingly, in one embodiment, the outer second ball tracks and the inner second ball tracks are, in each case, slanted codirectionally with one another. In particular, the homokinetic rotary ball joint is designed with outer first ball tracks and inner first ball tracks which are in each case slanted codirectionally with one another. Exemplary embodiments of such joints are in detail explained in connection with FIGS. 7, 8.

According to another embodiment, the outer first ball tracks and the outer second ball tracks or the inner first ball tracks and the inner second ball tracks are slanted codirectionally. This is in particular explained with reference to FIG. 7.

Moreover, it is possible that the outer first ball tracks and the outer second ball tracks or the inner first ball tracks and the inner second ball tracks are slanted contradirectionally. "Slanted" in particular means inclined, obliquely oriented or something similar. A descriptive explanation can, for example, be found below with regard to FIG. 8.

According to yet another embodiment, the group of outer first ball tracks has a first and a second subgroup, the outer first ball tracks of the first subgroup and the outer first ball tracks of the second subgroup being slanted contradirectionally, and in that the group of inner first ball tracks has a first and a second subgroup, the inner first ball tracks of the first subgroup and the inner first ball tracks of the second subgroup being slanted contradirectionally. This is, for example, depictured in FIGS. 9 and 10.

In one embodiment, the outer first ball tracks of the first subgroup and the outer first ball tracks of the second subgroup and/or the inner first ball tracks of the first subgroup and the inner first ball tracks of the second subgroup are arranged alternately over the circumference (see for example FIG. 9 and the corresponding description).

BRIEF DESCRIPTION OF DRAWINGS

Exemplary embodiments of the invention itself, as well as the field of invention, is described in connection with the attached Figures, wherein the Figures shall not restrict the invention in any way. Preferred embodiments are explained below with reference to the drawings figures in which:

FIG. 7 shows a developed view of the joint inner part of a plunging joint according to a sixth embodiment;

FIG. 8 shows a developed view of a joint inner part of a plunging joint according to a seventh embodiment;

FIG. 9 shows a developed view of the joint inner part of a plunging joint according to an eighth embodiment;

FIG. 10 shows a developed view of the joint inner part of a plunging joint according to a ninth embodiment.

DETAILED DESCRIPTION

Figure 1A:
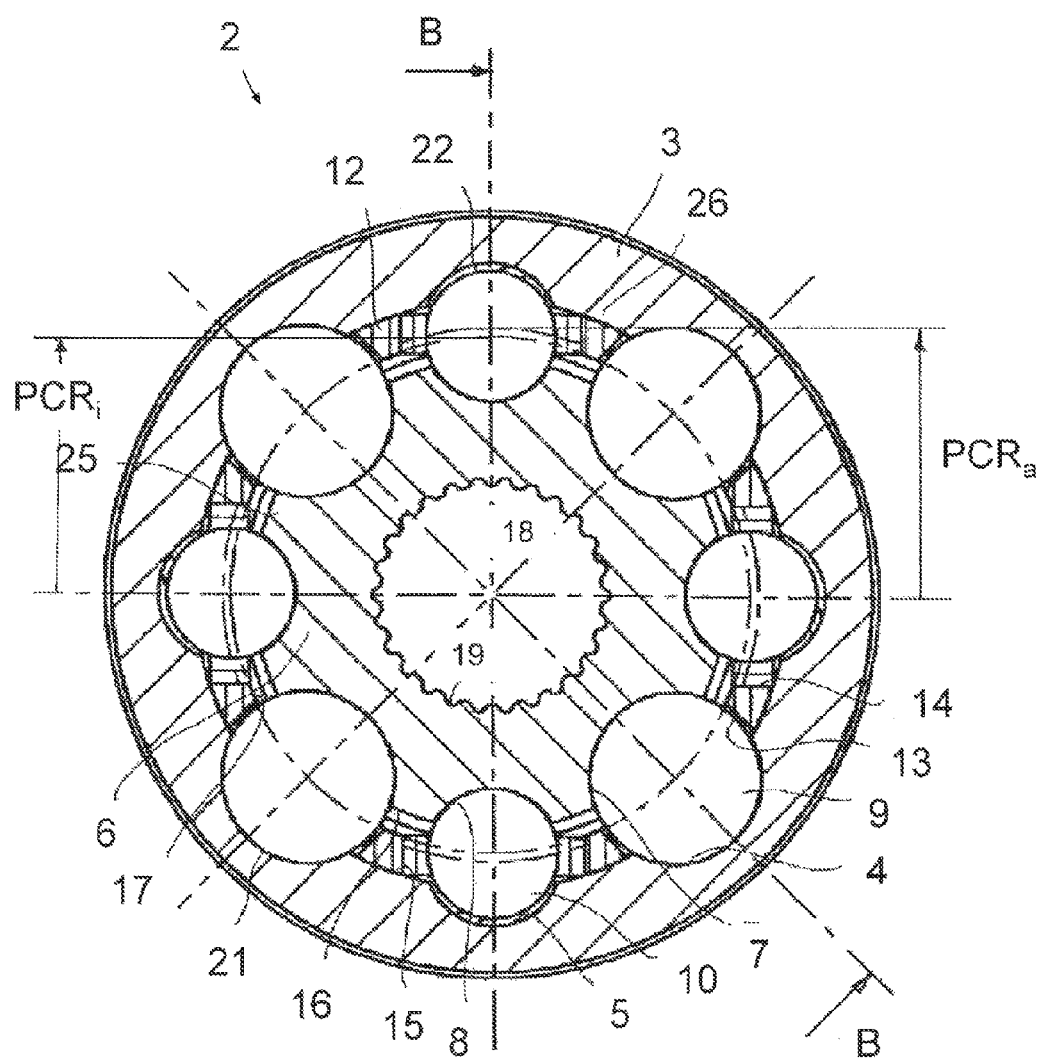
FIG. 1 shows a plunging joint according to a first embodiment:
 a) in cross section;
 b) in longitudinal section along the sectional line B-B from FIG. 1a);
 c) a developed view of the joint inner part from FIGS. 1a) and 1b)

FIGS. 1 to 5 are first described together below in terms of their common features, identical components being given the same reference numerals and modified components being given subscripts.

In each case, a homokinetic plunging joint 2 according to an embodiment of the disclosure is shown, which has an annular joint outer part 3 with outer first and second ball tracks 4, 5, a hub-shaped joint inner part 6 with inner first and second ball tracks 7, 8, first and second balls 9, 10, which are guided in pairs of tracks including, in each case, an outer first and an inner first ball track 4, 7 and an outer second and an inner second ball track 5, 8, and a ball cage 12 with circumferentially distributed first and second windows 13, 14 in which the first and second balls 9, 10 are received.

The first pairs of tracks formed in each case from an outer and an inner first ball track 4, 7 and the second pairs of tracks formed in each case from an outer and an inner second ball track 5, 8 are arranged so as to be distributed alternately over the circumference. Webs 25 are formed in each case between two inner first and second ball tracks 7, 8 adjacent in the circumferential direction. Correspondingly, webs 26 are formed between two outer first and second ball tracks 4, 5 adjacent in the circumferential direction. At the same time, in each case, two first pairs of tracks and therefore two first balls 9 lie diametrically opposite one another with respect to the joint mid-axis A of the joint. Likewise, in each case, two second pairs of tracks and therefore two second balls 10 lie in each case diametrically opposite one another with respect to the joint mid-axis A. With the joint aligned, only the first balls 9 in the pairs of first ball tracks 4, 7 parallel to the longitudinal axis A transfer a torque, while, under torque, an axial force controlling the ball cage 12 occurs at the second balls 10. As illustrated, the homokinetic plunging joint 2 shown may be configured in each case with four axially parallel pairs of tracks and four axis-intersecting pairs of tracks which alternate over the circumference and therefore receive, overall, eight balls. Likewise, the joint may also have three or five axially parallel pairs of tracks and a corresponding number of axis-intersecting pairs of tracks which alternate over the circumference and therefore receive, overall, six or ten balls.

With the joint aligned, the outer first ball tracks 4 and the inner first ball tracks 7 have in each case axially parallel center lines, that is to say they are of uniform depth. These first ball tracks 4, 7 serve solely for torque transfer and have no control function for the ball cage 12. The outer second ball tracks 5 in each case form an intersection angle β with the joint mid-axis A in a radial view, with the joint aligned. The corresponding opposite inner second ball tracks 8 have with respect to the joint mid-axis A an equal and opposite second intersection angle β in a radial view, with the joint aligned. Outer and inner second ball tracks 5, 8 intersecting in this way are assigned, distributed over the circumference, to one another in pairs. The intersecting second ball tracks 5, 8 ensure the control function for the second balls 10 which are received in them and which are in each case located with their center point at the intersection point of the center lines of the second pairs of tracks. In the joint cross sections, the centrally symmetrical arrangement of the first and second balls 9, 10 can be seen, according to which in each case two torque-transferring first balls 9 and two controlling second balls 10 lie diametrically opposite one another, with the joint aligned. In this case, the torque-transferring first balls 9 have a larger diameter than the controlling second balls 10. This gives rise, overall, to a high torque capacity of the homokinetic plunging joint 2, along with a small construction space.

Figure 1B:
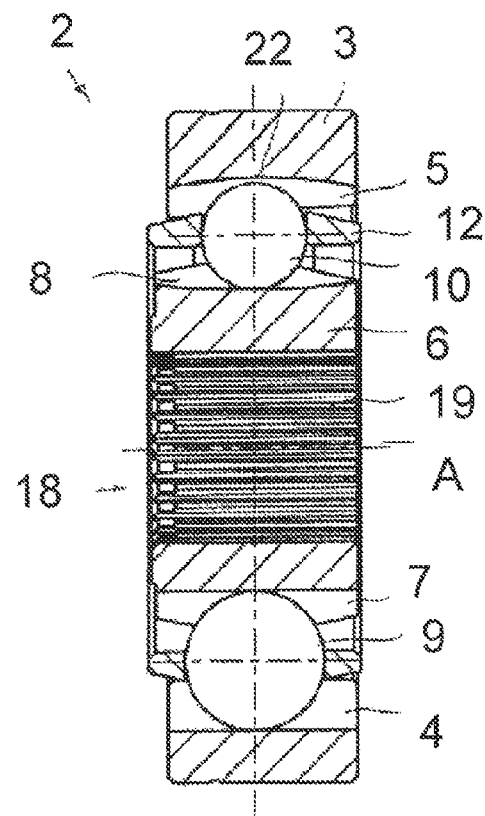
Figure 1C:
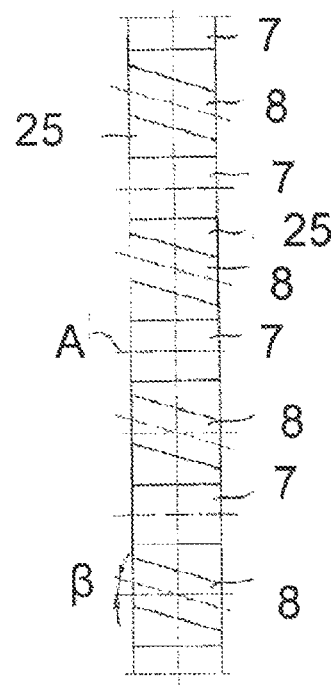

As may be gathered particularly from FIG. 1c), in the homokinetic plunging joints according to an embodiment, as shown in FIGS. 1 to 5, the second inner ball tracks 8 running at an angle to the joint mid-axis A are all slanted (meaning e.g. inclined, obliquely oriented) codirectionally with one another. The same applies to the opposite second outer ball tracks 5 of the joint outer part 3 which are not illustrated here. This type of cross-track joint is therefore characterized in that the joint outer part 3 and the joint inner part 6 have in each case only two types of ball tracks. It is, of course, also conceivable, however, to have designs in which in each case two or more groups of ball tracks intersecting the joint mid-axis A are provided in the joint outer part and in the joint inner part. This is also dealt with further below.

The joint outer part 3 has an inner-cylindrical guide surface 15 for guiding the ball cage 12. The joint inner part 6 has, as seen in longitudinal section, a roof-shaped guide surface 16 which is interrupted by the inner ball tracks 7, 8. The roof-shaped guide surface 16 is composed of middle spherical surface portions and of conical surface portions adjoining the latter tangentially. The joint inner part 6 is guided with respect to the inner surface 17 of the ball cage 12 by means of the guide surface 16. Furthermore, a central orifice 18 with a longitudinal toothing 19 for the rotationally fixed insertion of a drive shaft, not illustrated here, is provided on the joint inner part 6.

The various special features of the homokinetic plunging joints 2 are described below.

The homokinetic plunging joint 2 as shown in FIG. 1, is characterized in that a markedly greater radial play 22 is provided between the controlling second balls 10 and the outer second ball tracks 5 than between the torque-transferring first balls 9 and the first ball tracks 4, 7. This is achieved in that, in the cross section through the aligned joint, the radial spacing of the track center lines $PCR_a$ of the outer second ball tracks 5 with respect to the joint mid-axis A is greater than the radial spacing of the track center lines $PCR_i$ of the inner second ball tracks 8 with respect to the joint mid-axis A, the track center lines of the outer second ball tracks 5 being offset radially outwards with respect to a nominal rolling circle radius. Owing to this measure, the second balls 10 are freed with respect to the outer ball tracks 5, so that frictional forces are reduced.

Figure 2:
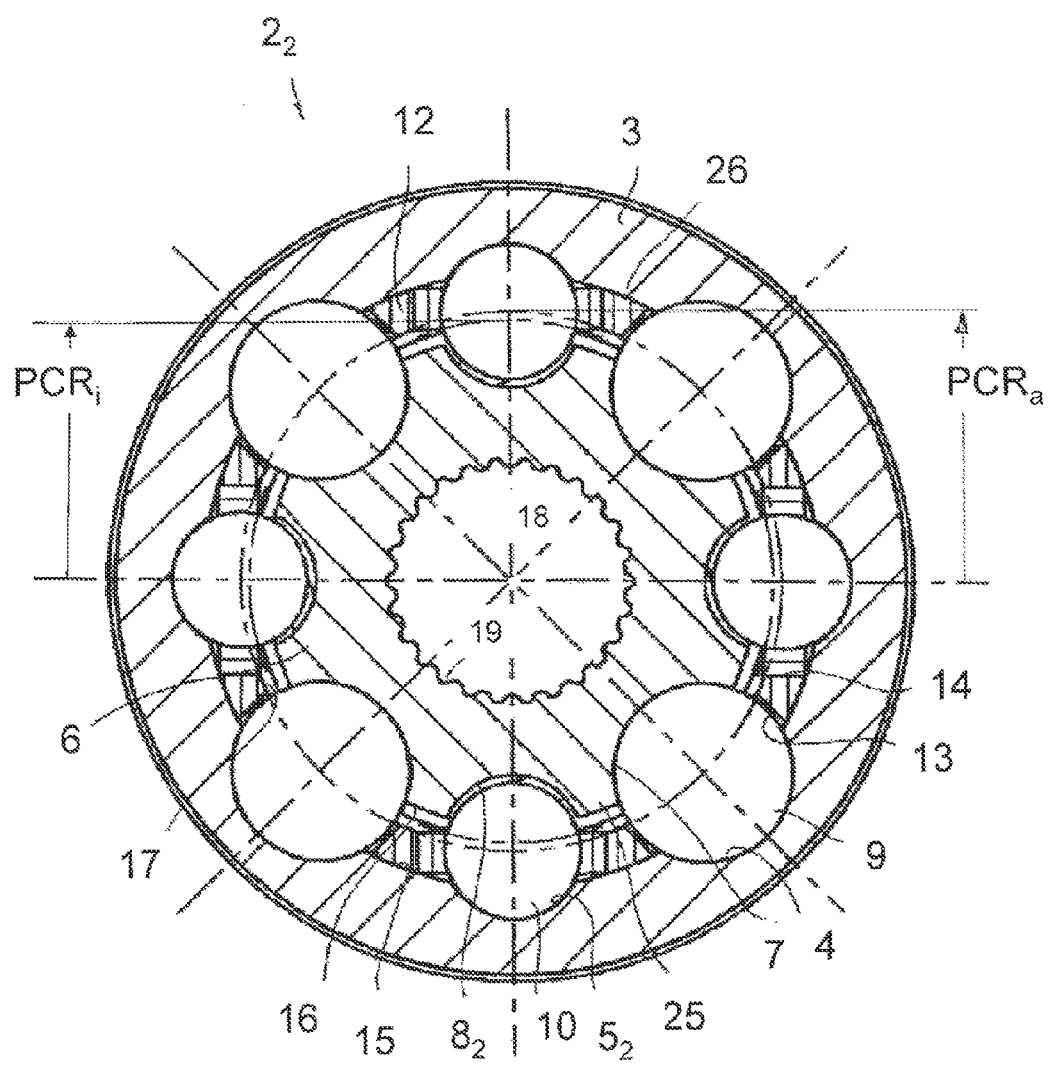
FIG. 2 shows a plunging joint according to a second embodiment in cross section.

FIG. 2 shows a homokinetic rotary joint $2_2$ according to a second embodiment. The set-up and functioning of the present homokinetic rotary joint correspond as close as possible to the joint shown in FIG. 1. To that extent, reference is made to the above description with regard to the common features, identical components being given the same reference numerals. In the present embodiment, too, the radial play of the controlling second balls 10 is greater than that of the torque-transferring first balls 9. In contrast to the embodiment according to FIG. 1, this is achieved in that, as seen in the cross section through the aligned joint, the radial spacing of the track center lines $PCR_a$ of the outer second ball tracks $5_2$ with respect to the joint mid-axis A is greater than the radial spacing $PCR_i$ between the track center lines of the inner second ball tracks $8_2$ and the joint mid-axis A, the track center lines of the inner second ball tracks $8_2$ being offset radially inwards with respect to a nominal rolling circle radius.

Figure 3:
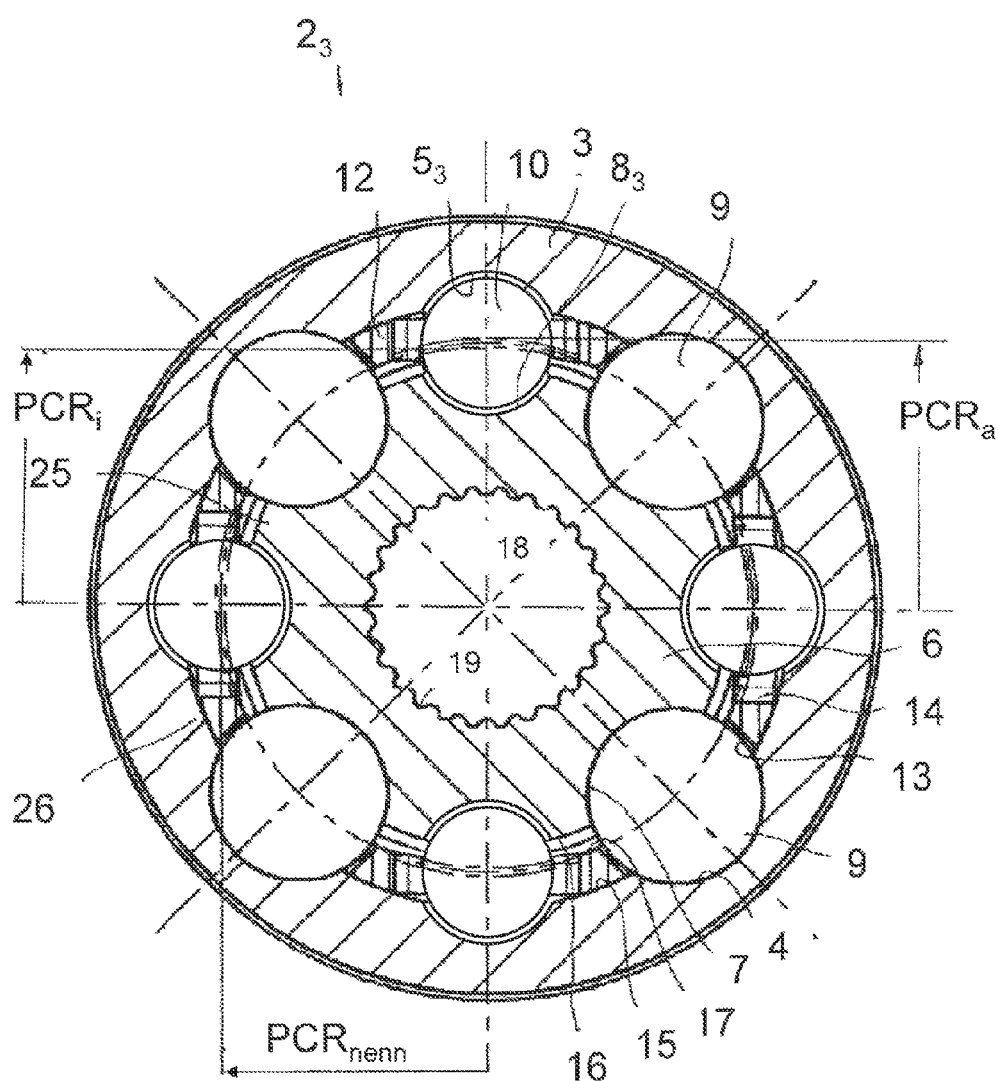
FIG. 3 shows a plunging joint according to a third embodiment in cross section.

FIG. 3 shows a homokinetic rotary joint $2_3$ according to a third embodiment, the set-up and functioning corresponding as close as possible to the abovementioned joints according to FIGS. 1 and 2. Reference is therefore made to the above description with regard to the common features, identical components being given the same reference numerals. In the present embodiment, too, the radial play of the controlling second balls 10 is greater than that of the torque-transferring first balls 9. This is achieved by means of a combination of the measures according to FIGS. 1 and 2, that is to say both the track center lines of the outer second ball tracks $5_3$ are offset radially outwards with respect to a nominal rolling circle radius $PCR_{nom}$ and the track center lines of the inner second ball tracks $8_3$ are offset radially inwards with respect to the nominal rolling circle radius $PCR_{nom}$.

Figure 4:
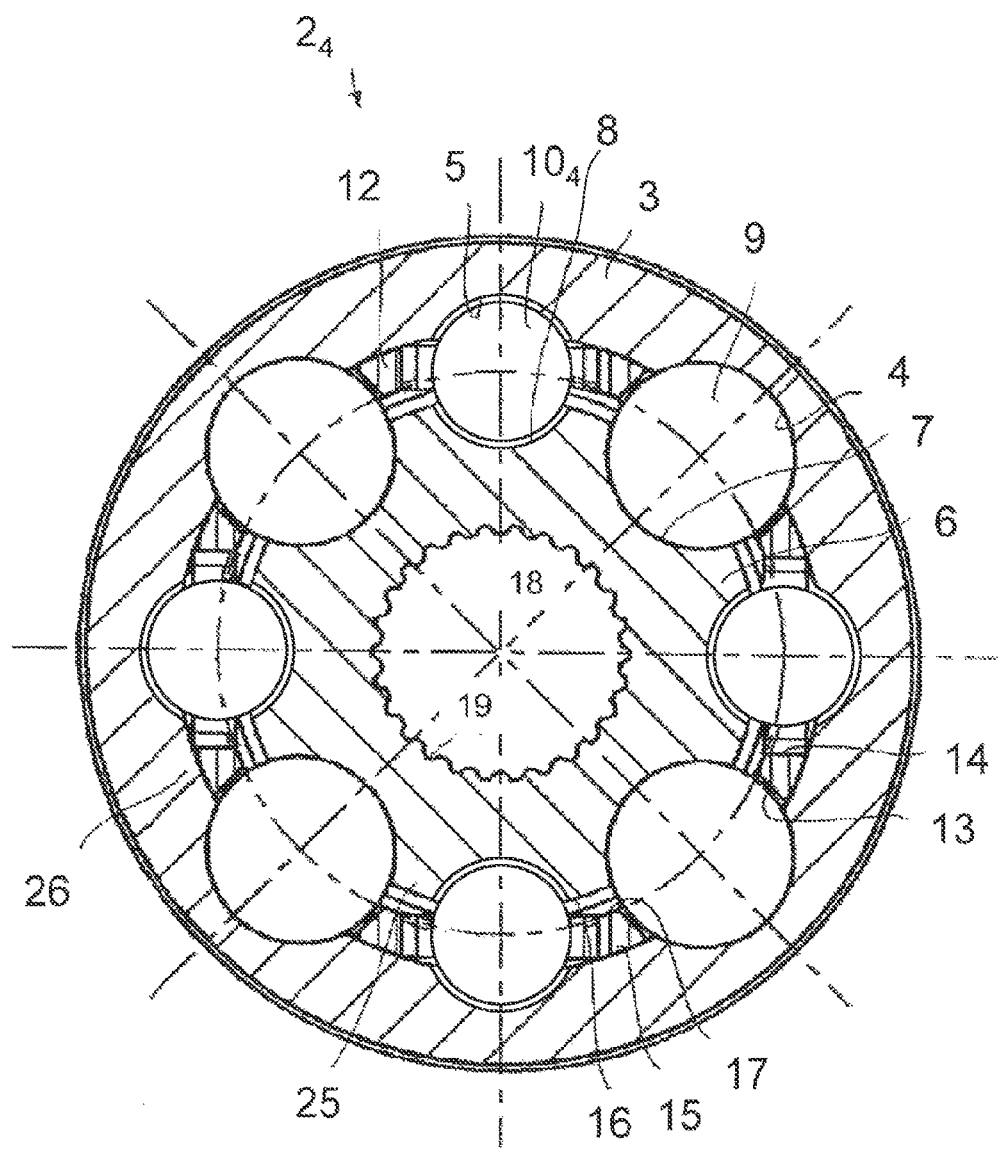
FIG. 4 shows a plunging joint according to a fourth embodiment in cross section.

The embodiment shown in FIG. 4 is characterized in that the diameters for the controlling second balls $10_4$ are reduced such as to form between the second ball tracks 5, 8 and the balls 10₄ a radial play which exceeds the radial play of the first balls 9 in the first ball tracks 4, 7. The homokinetic plunging joint 2₄ shown otherwise corresponds to those shown in FIG. 3, and therefore reference may be made to the above description with regard to the common features.

Figure 5:
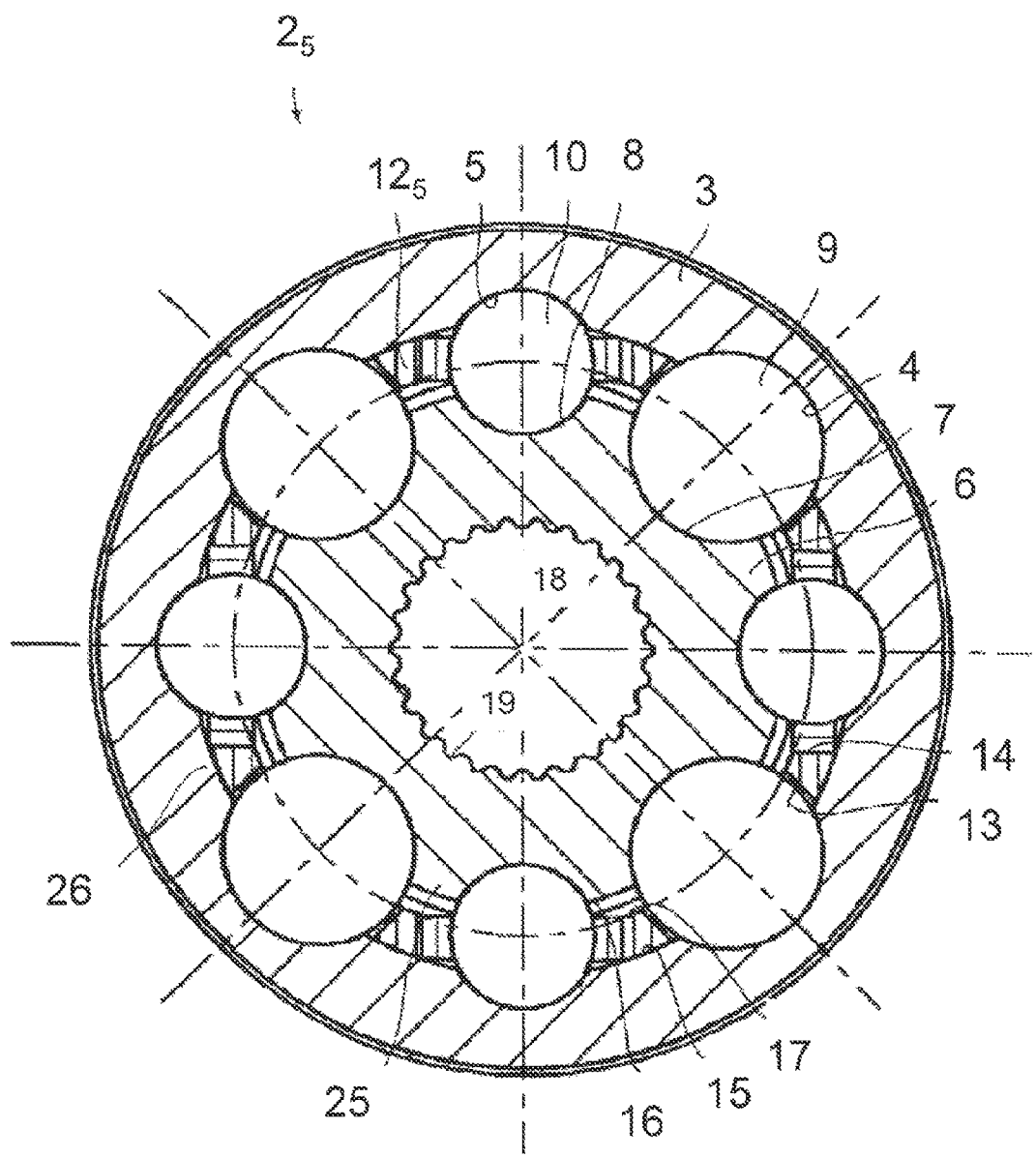
FIG. 5 shows a plunging joint according to a fifth embodiment in cross section.
Figure 6A:
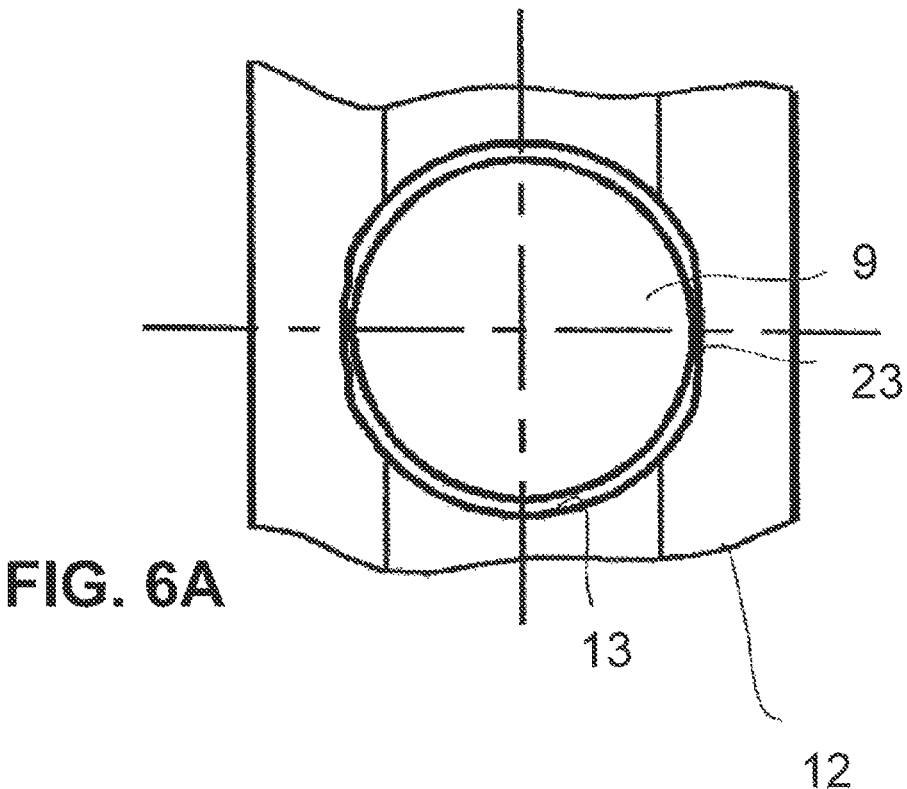
FIG. 6 shows the ball cage of the plunging joint according to FIG. 5:
 a) in a radial view,
 b) partially in section.
Figure 6B:
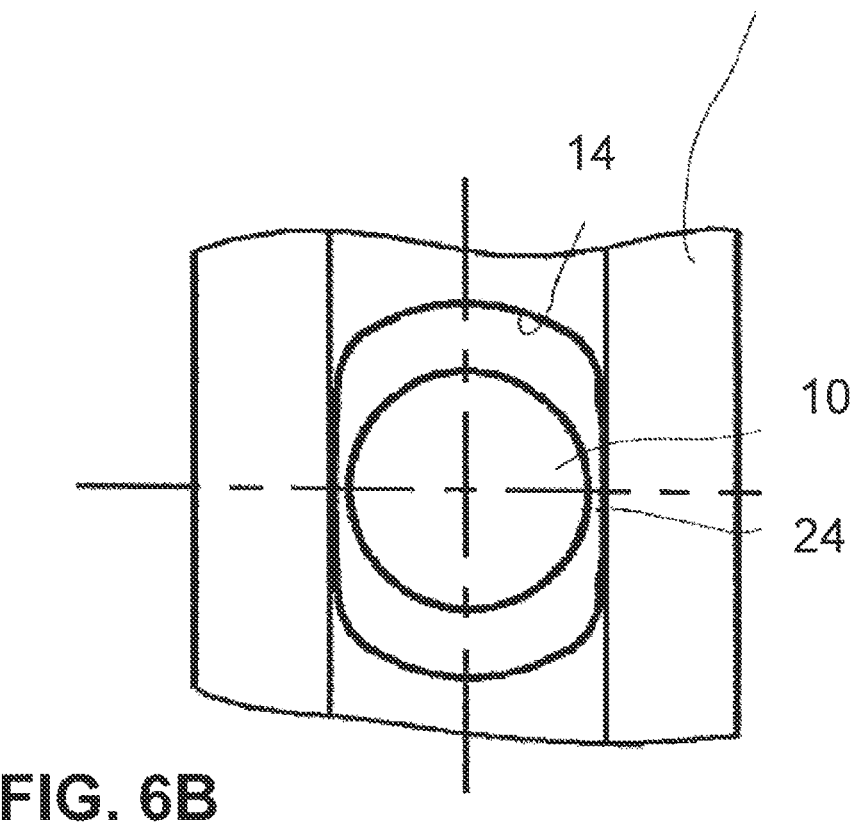

FIGS. 5 and 6, which are described jointly below, depict a homokinetic plunging joint 2₅ and its ball cage 12₅ in a further embodiment. In this case, FIG. 6 shows portions of the ball cage 12₅ of the joint 2₅ according to FIG. 5, specifically with a first cage window 13, in which a first ball 9 is received, and with a second cage window 14, in which a second ball 10 is received. The set-up and functioning of the present homokinetic rotary joint correspond as close as possible to the joint shown in FIG. 1. To that extent, reference is made to the above description with regard to the common features, identical components being given the same reference numerals and modified components being given reference numerals with subscripts having the numeral five. In contrast to the joint according to FIG. 1, in the present embodiment no appreciable radial play exceeding the customary manufacturing tolerances is provided between the controlling second balls 10 and the corresponding pairs of tracks 5, 8. As may be gathered particularly from FIG. 6, a second axial play 24 formed in each case between the second balls 10 and the second cage windows 14 is greater than a first axial play 23 formed between the first balls 9 and the first cage windows 13. This configuration also constitutes a measure for reducing the frictional forces, so that the vibration behaviour of the homokinetic plunging joint 2, overall, is improved.

It will be appreciated that a combination of the present embodiment with one of the embodiments according to FIGS. 1 to 4 is also possible, that is to say a homokinetic plunging joint in which in each case a marked (meaning e.g. significant, considerable) radial play is provided between the second balls and the second ball tracks and in which, furthermore, a marked axial play is formed between the second balls and the associated second cage windows.

In all the homokinetic plunging joints described above, the outer and the inner first ball tracks run parallel to the joint mid-axis when the joint is aligned. According to further embodiments, not illustrated here, it is likewise conceivable that, with the joint aligned, the outer and inner first ball tracks intersect the joint mid-axis at first angles equal to one another. These first angles are smaller than the second angles which the second ball tracks form with the joint mid-axis. What is achieved by the staggered first ball tracks is that the webs formed in the circumferential direction between the first and the second ball tracks are widened, this having a beneficial effect on the strength of the joint.

Overall, all the exemplary embodiments described above have the advantage that frictional forces between the controlling second balls and the associated ball tracks, particularly when the joint is articulated, are reduced. Thus, during torque transfer with angling, the second balls are relieved, so that vibrations are reduced. This leads to an improved NVH behaviour (noise, vibration, harshness) in the drive train.

Further exemplary embodiments of plunging joints are shown in FIGS. 7 to 10, are described below, to which the features, described above in connection with FIGS. 1a, 2, 3, 4 or 5, for reducing the frictional forces on the controlling second balls can be transferred. FIGS. 7 to 10 illustrate in each case only developed views of the joint inner part, the plunging joint possibly corresponding, particularly with regard to the freeing and/or release of the second balls, in its set-up and its functioning to each individual joint of those mentioned above according to FIGS. 1a, 2, 3, 4 or 5. To that extent, reference is made to the above description, modified components being given reference numerals increased by 100. All the plunging joints according to FIGS. 7 to 10 share the common feature that the torque-transferring first ball tracks 107, 207, 307', 307", 407', 407" are inclined at an angle with respect to the joint mid-axis A. In this case, the first angles α (alpha) which the first ball tracks 107, 207, 307', 307", 407', and 407" form with the joint mid-axis A are in this case smaller than the second angles β (beta) which the second ball tracks 108, 208, 308, 408 form with the joint mid-axis A. The special features of the individual forms of construction are explained below.

The plunging joint shown in FIG. 7 is characterized in that the first inner ball tracks 107 and the second inner ball tracks 108 are slanted codirectionally with respect to the joint mid-axis A. The advantage of this is that the webs 25 formed between two adjacent ball tracks have a maximum thickness in the circumferential direction at their ends at which two adjacent first and second ball tracks 107, 108 run one on the other. This gives rise to high strength, thus having the effect on the plunging joint of prolonging its useful life. The angles α at which the inner first ball tracks 107 intersect the joint mid-axis A and the angles at which the outer first ball tracks, not illustrated here, intersect the joint mid-axis A are equal and oppositely directed.

In the plunging joint shown in FIG. 8, in contrast to the above exemplary embodiment, the outer first ball tracks and the outer second ball tracks, which cannot be seen here, and the inner first ball tracks 207 and the inner second ball tracks 208 are slanted contradirectionally. In this case, it is true, here too, that the first angles α at which the outer and inner first ball tracks 207 intersect the joint mid-axis A are in each case smaller than the second angles β at which the outer and inner second ball tracks 208 intersect the joint mid-axis A.

The special feature of the plunging joints according to FIGS. 9 and 10 is that the groups of torque-transferring outer and inner first ball tracks in each case comprise two subgroups. Specifically, a first subgroup of inner first ball tracks 307', 407' is directed oppositely to a second subgroup of inner first ball tracks 307", 407". In this case, the first angles α' at which the inner first ball tracks 307', 407' of the first group intersect the joint mid-axis A are equal and oppositely directed to the first angles α" at which the inner first ball tracks 307", 407" of the second group intersect the joint mid-axis A. The same applies similarly to the corresponding outer ball tracks of the joint outer part which are not illustrated here.

In the exemplary embodiment according to FIG. 9, the inner first ball tracks 307' of the first subgroup and the inner first ball tracks 407" of the second subgroup—and, similarly to this, the outer first ball tracks, not illustrated here, of the first subgroup and the outer first ball tracks of the second subgroup—are arranged alternately over the circumference.

By contrast, in the exemplary embodiment according to FIG. 10, in each case two inner first ball tracks 407', adjacent in the circumferential direction, of the first subgroup and in each case two inner first ball tracks 407", adjacent in the circumferential direction, of the second subgroup are codirectional, that is to say, as seen in a developed view, they run parallel to one another. The same applies to the outer first ball tracks of the joint outer part which lie opposite the inner first ball tracks 407', 407" and intersect these.

What is claimed:

1. A homokinetic rotary ball joint in the form of a plunging joint, comprising:
    a joint outer part with a group of outer first ball tracks and a group of outer second ball tracks, the outer second ball tracks intersecting a joint mid-axis when the joint is aligned;
    a joint inner part with a group of inner first ball tracks and a group of inner second ball tracks, the inner second ball tracks intersecting the joint mid-axis when the joint is aligned;
    first balls which are held in first pairs of tracks that include, in each case, an outer first ball track from the group of the outer first ball tracks and an inner first ball track from the group of inner first ball tracks;
    second balls which are held in second pairs of tracks that include, in each case, an outer second ball track from the group of outer second ball tracks and an inner second ball track from the group of inner second ball tracks, in each case the outer and the inner ball track of the second pairs of tracks intersecting one another;
    a ball cage which has, distributed circumferentially, cage windows in which the first and the second balls are held in a common plane;
    wherein a second radial play formed between the second balls and the second ball tracks is greater than a first radial play formed between the first balls and the first ball tracks.

2. The homokinetic rotary ball joint according to claim 1 wherein a greater axial play is formed, in each case, between the second balls and the associated second cage windows than between the first balls and the associated first cage windows.

3. The homokinetic rotary ball joint according to claim 1 wherein, as seen in the cross section through the aligned joint, a radial spacing of track center lines of the outer second ball tracks with respect to the joint mid-axis is greater than a radial spacing between track center lines of the inner second ball tracks and the joint mid-axis.

4. The homokinetic rotary ball joint according to claim 1 wherein, in the cross section through the joint, a nominal radius of the outer second ball tracks is greater than a radius of the second balls.

5. The homokinetic rotary ball joint according to claim 1 wherein, in the cross section through the joint, a nominal radius of the inner second ball tracks is greater than the radius of the second balls.

6. The homokinetic rotary ball joint according to claim 1 wherein the second balls have a smaller diameter than the first balls.

7. The homokinetic rotary ball joint according to claim 1 wherein the outer and inner first ball tracks run parallel to the joint mid-axis when the joint is aligned.

8. The homokinetic rotary ball joint according to claim 1 wherein, the outer and inner first ball tracks intersect the joint mid-axis when the joint is aligned, the first angles which the outer and inner first ball tracks form with the joint mid-axis being smaller than the second angles which the outer and inner second ball tracks form with the joint mid-axis.

9. The homokinetic rotary ball joint according to claim 8 wherein the group of outer first ball tracks has a first and a second subgroup, the outer first ball tracks of the first subgroup and the outer first ball tracks of the second subgroup being slanted contradirectionally, and in that the group of inner first ball tracks has a first and a second subgroup, the inner first ball tracks of the first subgroup and the inner first ball tracks of the second subgroup being slanted contradirectionally.

10. The homokinetic rotary ball joint according to claim 9, wherein the outer first ball tracks of the first subgroup and the outer first ball tracks of the second subgroup and/or the inner first ball tracks of the first subgroup and the inner first ball tracks of the second subgroup are arranged alternately over the circumference.

11. The homokinetic rotary ball joint according to claim 8, wherein the outer second ball tracks and the inner second ball tracks are in each case slanted codirectionally with one another.

12. The homokinetic rotary ball joint according to claim 11, wherein the outer first ball tracks and the inner first ball tracks are in each case slanted codirectionally with one another.

13. The homokinetic rotary ball joint according to claim 12 wherein the outer first ball tracks and the outer second ball tracks or the inner first ball tracks and the inner second ball tracks are slanted codirectionally.

14. The homokinetic rotary ball joint according to claim 12 wherein the outer first ball tracks and the outer second ball tracks or the inner first ball tracks and the inner second ball tracks are slanted contradirectionally.

15. The homokinetic rotary ball joint according to claim 11 wherein the outer first ball tracks and the outer second ball tracks or the inner first ball tracks and the inner second ball tracks are slanted codirectionally.

16. The homokinetic rotary ball joint according to claim 11 wherein the outer first ball tracks and the outer second ball tracks or the inner first ball tracks and the inner second ball tracks are slanted contradirectionally.

17. The homokinetic rotary ball joint according to claim 11 wherein the group of outer first ball tracks has a first and a second subgroup, the outer first ball tracks of the first subgroup and the outer first ball tracks of the second subgroup being slanted contradirectionally, and in that the group of inner first ball tracks has a first and a second subgroup, the inner first ball tracks of the first subgroup and the inner first ball tracks of the second subgroup being slanted contradirectionally.

18. The homokinetic rotary ball joint in the form of a plunging joint, comprising:
    a joint outer part with a group of outer first ball tracks and a group of outer second ball tracks, the outer second ball tracks intersecting a joint mid-axis when the joint is aligned;
    a joint inner part with a group of inner first ball tracks and a group of inner second ball tracks, the inner second ball tracks intersecting the joint mid-axis when the joint is aligned;
    first balls which are held in first pairs of tracks including, in each case, an outer first ball track from the group of outer first ball tracks and of an inner first ball track from the group of inner first ball tracks;
    second balls which are held in second pairs of tracks including, in each case, an outer second ball track from the group of outer second ball tracks and of an inner second ball track from the group of inner second ball tracks, in each case the outer and the inner ball track of the second pairs of tracks intersecting one another;
    a ball cage which has, distributed circumferentially, first and second cage windows in which the first and the second balls are held in a common plane;
    wherein a second axial play formed between the second balls and the second cage windows is greater than a first axial play formed between the first balls and the first cage windows.

19. The homokinetic rotary ball joint according to claim 18 wherein a second radial play formed between the second balls and the second ball tracks is greater than a first radial play formed between the first balls and the first ball tracks.

* * * * *